(12) United States Patent
Kallfass et al.

(10) Patent No.: US 12,152,610 B2
(45) Date of Patent: Nov. 26, 2024

(54) METHOD FOR MINIMIZING THE DITHER HUM ON A VALVE

(71) Applicant: Robert Bosch GmbH, Stuttgart (DE)

(72) Inventors: Ingo Kallfass, Bretten-Diedelsheim (DE); Steffen Knapper, Vaihingen/Enz (DE); Reiner Kunz, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 104 days.

(21) Appl. No.: 18/050,638

(22) Filed: Oct. 28, 2022

(65) Prior Publication Data

US 2023/0139395 A1    May 4, 2023

(30) Foreign Application Priority Data

Nov. 2, 2021  (DE) .................. 10 2021 212 309.0

(51) Int. Cl.
*F16K 31/06*    (2006.01)
*F15B 13/04*    (2006.01)

(52) U.S. Cl.
CPC ...... *F15B 13/0402* (2013.01); *F16K 31/0613* (2013.01)

(58) Field of Classification Search
CPC ................ F15B 13/0402; F15B 21/087; F15B 2013/0409; F15B 2211/328;

(Continued)

(56) References Cited

U.S. PATENT DOCUMENTS

| 4,960,365 A | * | 10/1990 | Horiuchi | G05D 3/18 |
| | | | | 251/129.05 |
| 9,543,097 B2 | * | 1/2017 | Suzuki | H01H 47/325 |

(Continued)

FOREIGN PATENT DOCUMENTS

| DE | 10 2008 013 602 B4 | 7/2019 |
| DE | 10 2019 204 246 A1 | 1/2020 |

(Continued)

OTHER PUBLICATIONS

"Differential Transformer", https://de.wikipedia.org/wiki/Differentialtransformator, Germany, available at least as early as Apr. 22, 2020 (5 pages).

(Continued)

*Primary Examiner* — Kelsey E Cary
(74) *Attorney, Agent, or Firm* — Maginot, Moore & Beck LLP

(57) ABSTRACT

A method is for operating a valve that includes a linearly movable control slide, at least one solenoid, and a position sensor. The linearly movable control slide is preloaded by at least one spring in a direction of a zero position. The at least one solenoid is coupled to the control slide in such a way that the control slide can be moved away from the zero position by application of current to the solenoid. The position sensor is configured to measure an actual instantaneous position of the control slide. Each solenoid is assigned a current control device configured to influence a current through the relevant solenoid based on an instantaneous current control variable. The instantaneous current control variable is dependent on a quasi-periodic dither current control variable. The method also includes calculating an actual dither amplitude from the actual instantaneous position using a band-pass filter.

13 Claims, 3 Drawing Sheets

(58) Field of Classification Search
CPC ........ F15B 2211/634; F15B 2211/6656; F16K 31/0613; F16K 31/0675; F16K 37/0041; H01F 7/1844; H01F 2007/185; H01F 2007/1866; H01F 2007/1888
See application file for complete search history.

(56) References Cited

U.S. PATENT DOCUMENTS

| | | | | |
|---|---|---|---|---|
| 2014/0320326 | A1* | 10/2014 | Buhmann | H03M 3/382 |
| | | | | 341/143 |
| 2018/0328514 | A1* | 11/2018 | Mizuno | F16K 31/0675 |
| 2020/0089261 | A1* | 3/2020 | Kono | G05B 19/042 |
| 2021/0265090 | A1* | 8/2021 | De Cock | H03K 3/017 |
| 2021/0364099 | A1* | 11/2021 | Ott | H01F 7/1844 |

FOREIGN PATENT DOCUMENTS

| | | | |
|---|---|---|---|
| EP | 2 280 179 | B1 | 8/2016 |
| EP | 2 740 980 | B1 | 12/2018 |

OTHER PUBLICATIONS

"Pulse Width Modulation", https://de.wikipedia.org/wiki/Pulsdauermodulation, Germany, available at least as early as Nov. 2, 2021 (7 pages).

* cited by examiner

METHOD FOR MINIMIZING THE DITHER HUM ON A VALVE

This application claims priority under 35 U.S.C. § 119 to patent application no. DE 10 2021 212 309.0, filed on Nov. 2, 2021 in Germany, the disclosure of which is incorporated herein by reference in its entirety.

The disclosure relates to a method for operating a, preferably hydraulic, valve as disclosed herein.

BACKGROUND

A corresponding valve is known, for example, from EP 2 280 179 B1 or DE 10 2019 204 246 A1. In this case, a linearly movable control slide is preloaded into a zero position by means of at least one spring. By means of two solenoids, the control slide can be adjusted in two opposite directions starting from the zero position, it being possible for the position of the control slide to be measured by means of a position sensor. The solenoids are coupled to the control slide via a pilot valve, it being possible for the pilot valve to be designed for example according to EP 2 740 980 B1 or as a 4/3 proportional directional control valve. The present disclosure can also be used for a valve which is actuated directly by means of the at least one solenoid. In the disclosure, a single solenoid can be provided, the zero position being an end position of the control slide.

It is known from U.S. Pat. No. 4,960,365 to actuate the solenoid of a valve using what is known as a dither. In this case, a periodic dither current control variable is superimposed on an effective current control variable. In this case, the effective current control variable represents the position of the control slide actually desired by the user of the valve. The dither current control variable serves to keep the control slide continuously in motion, such that a lubricating film always remains between the control slide and the surrounding housing, no static friction occurring, which would influence the control behavior of the valve in a very disadvantageous manner. It should be noted that U.S. Pat. No. 4,960,365 discloses a controlled adjustment of the control slide, the present disclosure preferably being used with a position-controlled adjustment of the valve in order to achieve a high adjustment accuracy.

The disadvantage of the dither is that what is known as a dither hum can be excited as a result. As a result, parts of the machine in which the valve is installed can be excited to oscillate, which can cause a considerable noise nuisance. It is therefore typically attempted to select the frequency of the dither such that no resonances are encountered, the amplitude of the dither being selected to be so small that the above-explained effect of minimizing the friction still occurs.

In the case of the use of pilot valves, it has been shown that the required amplitude of the dither is subject to considerable serial scattering. Furthermore, the required amplitude of the dither is dependent on the instantaneous operating conditions of the valve, such as operating pressure and set volume flow. Thus, if an amplitude of the dither excitation is to be firmly specified, this is too large in the vast majority of the operating time, the dither hum being unnecessarily loud.

The object of the disclosure is that of minimizing dither humming, the valve nonetheless operating reliably under the influence of serial scattering and changing operating conditions, in particular the dither movement of the control slide being reliably maintained. Furthermore, the wear occurring during operation, in particular on the pilot valves, can be compensated for.

SUMMARY

It is proposed for an actual dither amplitude to be calculated from the actual instantaneous position using a band-pass filter, a dither controller being provided, which, by adjustment of an amplitude of the dither current control variable and/or a waveform of the dither current control variable, causes the actual dither amplitude to not fall below a predetermined minimum dither amplitude. The proposed control makes it possible for the micro-oscillations of the control slide to be reliably maintained. The relevant actual variable of the control can be determined in a simple and cost-effective manner by means of the band-pass filter; in addition to the position sensor, which is present in any case, no further measuring means are required for determining the actual variable of the dither control.

In the context of the present application, an effective value is to be understood to mean a low-pass filtered and/or a time-averaged instantaneous value.

The magnetic force of the solenoid can act on a ferromagnetic armature which is motion-coupled to the control slide (direct actuation). The solenoid can be a component of a, preferably hydraulic, pilot valve, an output pressure of the pilot valve acting on the control slide in the adjustment direction. The pilot valve is preferably designed as a pressure reducing valve. If two solenoids are provided, their adjustment directions are preferably directed opposingly. A corresponding pilot valve can be designed according to EP 2 740 980 B1.

The frequency of the dither current control variable can be between 70 Hz and 500 Hz, preferably between 100 Hz and 250 Hz. The term "quasi-periodic" is intended to describe the deviation from an ideally periodic dither current control variable caused by dither control according to the disclosure. A center frequency of the mentioned band-pass filter is preferably equal to the frequency of the dither current control variable.

The dither amplitude and/or dither waveform found in the context of the dither control is preferably stored when the system is switched off and used as a starting value for the dither control when the system is switched on again.

Advantageous developments and improvements of the disclosure are specified in the dependent claims.

It can be provided for the determination of the actual dither amplitude to comprise a determination of extreme values of the filtered actual instantaneous position. In this way, the actual dither amplitude can be calculated easily, in particular with low computing power.

It can be provided that the determination of the actual dither amplitude comprises a difference formation of directly successive extreme values. In this way, the actual dither amplitude can be calculated easily, in particular with low computing power. The corresponding peak-to-peak amplitude is nevertheless a measure for the strength of the dither movement of the valve slide that can be advantageously used within the context of the dither control.

It can be provided for the determination of the actual dither amplitude to comprise averaging over several of the mentioned differences. This avoids fast or high-frequency changes of the actual dither amplitude. A comparable effect can be achieved by means of low-pass filtering. However, this results in a significantly higher latency. After the system has been switched on, it would take significantly longer until the system is adjusted. In the case of sudden changes in the operating conditions, the dither movement could briefly come to a halt. These disadvantages are avoided by means of the proposed averaging.

It can be provided that the dither controller regulates the actual dither amplitude to a target dither amplitude, which is greater than or equal to the minimum dither amplitude. The dither controller is preferably a continuous, linear controller, in particular a PID, a PI or a P controller. By virtue of the fact that the target dither amplitude is at least temporarily, in particular immediately after the system is switched on, above the minimum dither amplitude, a dither movement of the control valve can be brought about very quickly, the desired noise minimization nonetheless occurring some time later.

It can be provided for the target dither amplitude to be reduced as long as the actual dither amplitude is above the minimum dither amplitude. The reduction of the desired dither amplitude preferably takes place continuously at a predetermined speed. If the dither controller is designed as a PID controller or as a PI controller, such that it has no remaining control deviation even in the event of interferences, the target dither amplitude can be reduced to the minimum dither amplitude.

It can be provided for the dither controller to be activated after the control slide is deflected from the zero position for a predetermined period of time. Thus, in the zero position, the dither movement and the associated noise development come to a halt. In this case, it must be taken into account that the valve is not used for the vast majority of the time, such that the dither oscillation of the valve slide is not required. If the valve slide returns to the zero position, the dither controller is preferably deactivated again only after a predetermined further period of time. This further period of time is preferably selected so as to be of such a length that it is comparatively certain that the valve is subsequently not used for a longer time.

It can be provided for the amplitude of the dither current control variable to be selected to be so large during the specified period of time that the actual dither amplitude is reliably above the minimum dither amplitude. The control of the dither amplitude accordingly begins with this amplitude of the dither current control variable. At the start of the dither control, it is ensured that the dither movement of the valve slide is present. In this way, the desired state of a minimum dither movement is brought about very quickly, in particular more quickly than if the dither control were to be implemented when the control slide is absolutely stationary.

It can be provided for the waveform of the dither current control variable to be able to be changed in steps. In this way, a very fine adjustment can be achieved in a simple manner, compared with an adjustment of the dither amplitude. Preferably, a plurality of value tables are specified, each describing a period of the dither current control variable. The waveform of the dither current control variable can accordingly be changed in discrete steps. The user of the valve can select the particular waveform which results in the smallest possible noise formation in the system in which the valve is used. Especially when the dither control is already in the vicinity of the desired minimum dither amplitude, an automated adjustment of the waveform, as a replacement for an automated adjustment of the dither amplitude, can be used to adjust the dither excitation as finely as possible.

It can be provided for the current control device to comprise a switching device by means of which a supply voltage can be switched on and off at the relevant solenoid, a pulse width modulator being provided, which is actuated by the instantaneous current control variable, the pulse width modulator actuating the switching device. The instantaneous current control variable thus corresponds to the duty cycle of the pulse width modulator. The frequency of the PWM can be fixedly predefined, it being for example 10 kHz. The supply voltage is preferably a DC voltage, the voltage level of which is highly preferably substantially constant. The PWM frequency and the dither frequency are preferably synchronized according to DE 10 2008 013 602 B4.

It can be provided for each solenoid to be assigned a current sensor and a current controller in each case, it being possible for an instantaneous current actual value flowing through the solenoid in question to be measured using the current sensor, the current controller regulating an effective current actual value, determined, in particular calculated, from the instantaneous current actual value, to a target effective current, by adjusting an instantaneous current control variable. The current sensor can for example comprise an ohmic measuring resistor, which is connected in series to the solenoid, the voltage drop at the measuring resistor being measured, the current flowing through the solenoid at that time being determined, in particular calculated, from the voltage drop. The effective current actual value is determined from the instantaneous current actual value, for example by low-pass filtering. This is intended to in particular eliminate the fluctuations of the current which are caused by the PWM. The current controller is preferably a continuous, linear controller, in particular a PID, a PI or a P controller.

It can be provided for the target effective current to be formed by superimposing an effective position control variable and the dither current control variable. The aforementioned superimposition is preferably calculated by adding the stated variables. Alternatively, it is conceivable for the dither current control variable to be superimposed with the instantaneous current control variable, so as to act on the system in a more controlling manner. As a result of the inclusion, proposed above, of the dither current control variable in the current regulation, the corresponding adjustment is much more effective and, above all in the case of different operating conditions, always has substantially the same effect. This is often not the case in the alternative mentioned.

An adjustment controller can be provided which, by adjusting the effective position control variable, regulates an actual effective position, determined, in particular calculated, from the actual instantaneous position, to a target effective position. The actual effective position is preferably determined by low-pass filtering from the actual instantaneous position. This is intended to eliminate the fluctuations caused by the dither. The position controller is preferably a continuous, linear controller, in particular a PID, a PI or a P controller.

Of course, the features mentioned above and those still to be explained below can be used not only in the respectively specified combinations, but also in other combinations or alone, without departing from the scope of the present disclosure.

BRIEF DESCRIPTION OF THE DRAWINGS

The disclosure is explained in more detail below with reference to the accompanying drawings. In the drawings.

DETAILED DESCRIPTION

Figure 1:
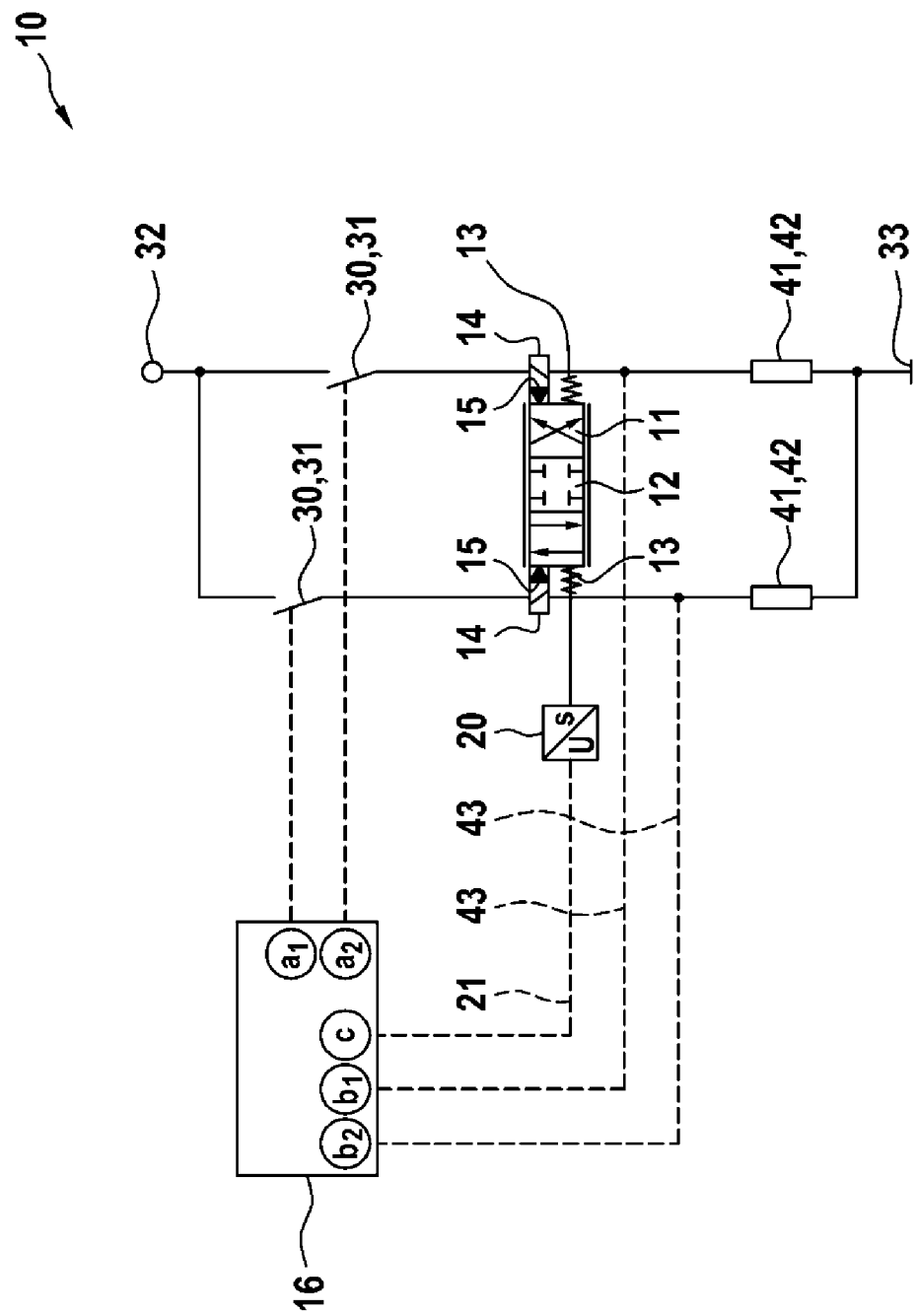
FIG. 1 is a circuit diagram of the valve on which the disclosure is based.

FIG. 1 is a circuit diagram of the valve 10 on which the disclosure is based. In the present case, the valve 10 is designed as a hydraulic slide valve, it also being possible for it to be designed as a seat valve. It has a middle zero position 12 which is preloaded by means of two springs 13. The zero position 12 can be an end position of the valve 10 which is preloaded by a single spring.

In the present case, the valve 10 is a 4/3-way valve, the zero position 12 forming a blocking position in which the associated cylinder (not shown) is firmly clamped, hydraulically. Starting from the zero position 12, the valve 10 can be continuously adjusted in two directions, the mentioned cylinder entering one valve position, whereby it moves out in the other valve position. The path by which the control slide 11 of the valve 10 is moved away from the zero position 12 determines the movement speed of the cylinder.

The present valve 10 is hydraulically adjusted in both adjustment directions, in each case by means of a pilot valve 15, the pilot valve 15 in turn being actuated by means of an associated solenoid 14. The two solenoids 14 are connected in parallel to a supply voltage 32 and to an electrical ground 33. The supply voltage 32 is preferably a DC voltage, although an AC voltage is also conceivable, provided that the corresponding alternating voltage frequency is higher than the PWM frequency. Each solenoid 14 is assigned a switching device 31 and a measuring resistor 42. The measuring resistor 42 is preferably connected between the relevant solenoid 14 and ground 33, such that the electrical potential between the measuring resistor 42 and the solenoid 14 represents an instantaneous current actual value 43. The explained arrangement forms a current sensor 41, because the mentioned instantaneous current actual value 43 can be calculated from the mentioned electrical potential.

The switching device 31 is designed such that it can quickly switch on and off the occurring currents, it being formed, for example, by a field effect transistor. In the present case, the switching device 31 is connected between the solenoid 14 and the supply voltage 32, because it influences the determination of the instantaneous current actual value 43 the least here. The two current control devices 30 are preferably designed identically.

Furthermore, a position sensor 20 is provided, which can for example operate according to the LVDT principle (https://de.wikipedia.org/wiki/Differential transformer). This converts the mechanical position of the control slide 11 into an electrical potential which corresponds to the actual instantaneous position 21 of the control slide 11. In particular the micromovements of the control slider 11 are reflected in the actual instantaneous position 21, which micromovements are caused by the dither explained further below.

The control device 11 preferably comprises a programmable digital computer. The control device 11 is connected to the two switching devices 31 in such a way that they can open and close the electrical circuits associated in each case. The control device 11 preferably comprises a plurality of analog-to-digital converters, by means of which the two instantaneous current actual values 43 and the actual instantaneous position 21 can be converted into digital values. The method according to the disclosure is preferably implemented digitally. The corresponding calculations are preferably carried out in a time-discrete manner. In this case, a plurality of calculation rounds are preferably carried out continuously at a fixed time interval of, for example, 1 ms. Each individual calculation round is preferably free of feedback. The feedback which occurs, for example, in the control loops explained further below is preferably made possible in that at least one calculation result of a calculation round is used at the earliest in the next calculation round.

Figure 2:
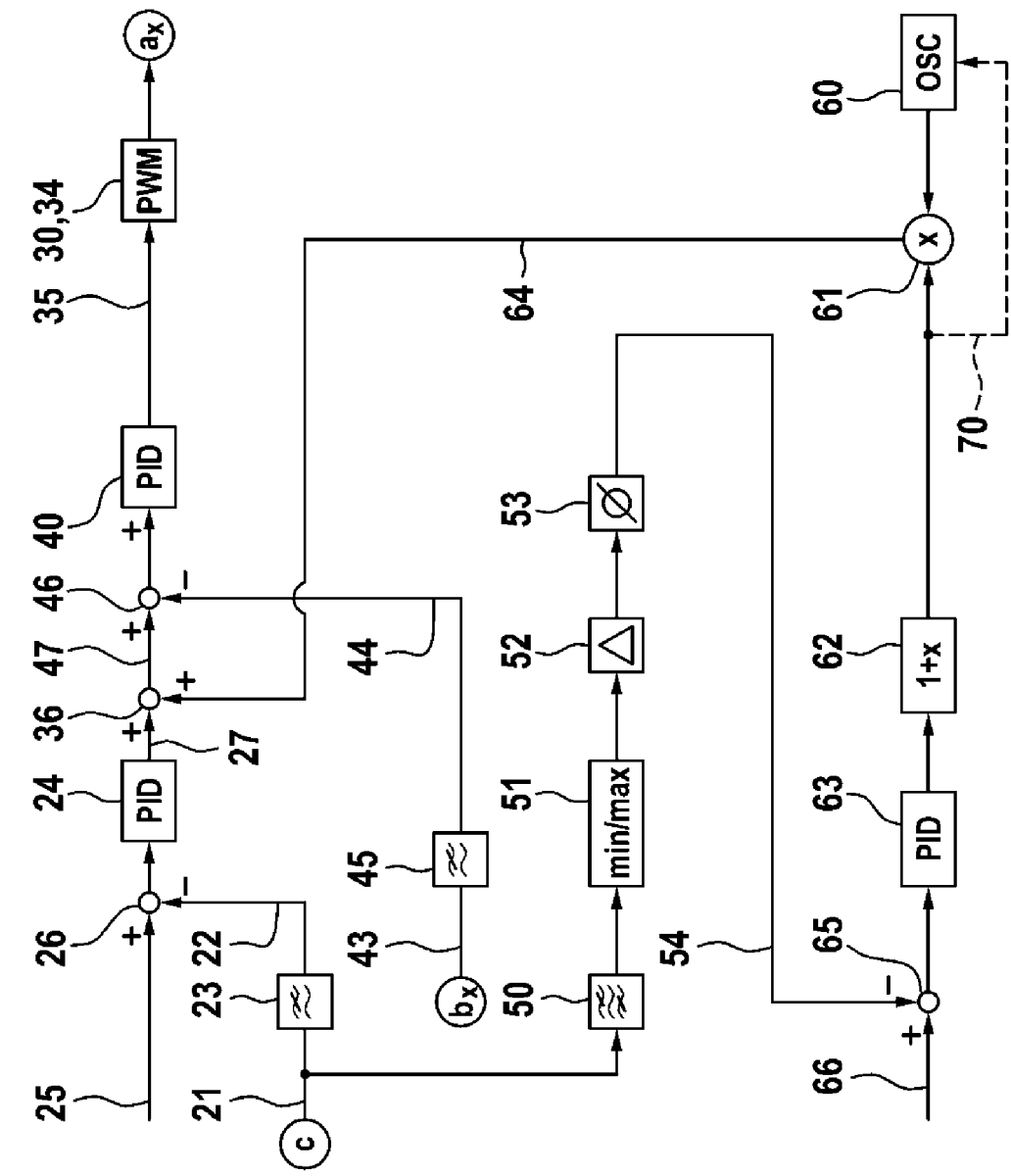
FIG. 2 is a control diagram illustrating the method according to the disclosure.

Reference is also made to the reference signs $a_1$, $a_2$, $b_1$, $b_2$ and c, the corresponding signal paths being included again in FIG. 2 as $a_x$, $b_x$ and c, it being possible for x to assume the value 1 or 2. It follows from this that the arrangement according to FIG. 2 is preferably present twice, specifically once for each of the two actuation directions of the valve 10.

FIG. 2 is a control diagram illustrating the method according to the disclosure.

The current actuator 30 comprises a pulse width modulator 34. At the input thereof, the instantaneous current control variable 35 is present, which corresponds to the duty cycle of the pulse width modulation (https://de.wikipedia.org/wiki/Pulse Duration Modulation). This is steplessly adjustable within the context of the digital resolution. A divalent signal is present at the output of the pulse width modulator 34, by means of which signal the switching device associated in each case (reference sign 31 in FIG. 1) is switched on and off in quick succession. The corresponding switching frequency can be for example 20 kHz. This frequency is so high that the valve slide substantially does not react to this excitation, due to its inertia. In contrast, the dither frequency of for example 140 Hz is significantly lower, such that the valve slide can perform the desired micro-oscillations.

The instantaneous current control variable 35 is provided by a current controller 40, which in the present case is designed as a PID controller, it also being possible for a PI or a P controller to be used. The effective current actual value 44 flows into the target-actual comparison 46 of this control loop as the actual variable, the corresponding target variable being formed from the additive superimposition 36 of the effective position control variable 27 and the dither current control variable 64. In this case, the effective current actual value 44 is determined by low-pass filtering 45 from the instantaneous current actual value 43 already explained with reference to FIG. 1. The cutoff frequency of the corresponding low-pass filter 45 is preferably selected such that the current fluctuations caused by the dither are contained in the effective current actual value 44, but the current fluctuations caused by the pulse width modulation substantially are not. The mentioned cutoff frequency is for example 1 kHz.

In the present case, the position controller 24, which provides the effective position control variable 27, is designed as a PID controller, although it is also possible for it to be designed as a PI or P controller. Its target variable is the target effective position 25, which is preferably predetermined by the user of the valve, for example by means of an operating lever. The actual effective position 22 flows into the corresponding target-actual comparison 26 as the actual variable. This is determined by low-pass filtering 23 from the actual instantaneous position 21 explained with reference to FIG. 1. The cutoff frequency of the corresponding low-pass filter 23 is designed such that the micromovements of the control slide caused by the dither are substantially no longer contained in the actual effective position 21. The mentioned cutoff frequency is for example 100 Hz. The position control 24 then operates virtually independently of the dither. Only in the subordinate current regulation 40 is the dither taken into account in the context of the target variable.

One special feature of the present disclosure is that the intensity of the dither is not fixedly predetermined. For the large majority of the operating time, it is selected so as to be so large that the desired micromovement of the control slide is present, but not greater. As a result, noise caused by the dither can be avoided.

The dither current control variable 64 is a quasi-periodic signal. For this purpose, the dither oscillator 60 provides a strictly periodic signal which can have one of the waveforms explained with reference to FIG. 3. This periodic signal is adjusted or modulated, with respect to amplitude, by multiplication 61. The frequency of the dither is for example 140 Hz. The amplitude of the dither is adjusted relatively slowly, even when the regulation is not yet in its stationary state.

In the present case, the dither controller 63 is designed as a PID controller, although it is also possible for it to be designed as a PI or P controller. The dither controller 63 is intended to ensure that the valve slide also actually mechanically performs the desired micro-oscillations, such that the entire valve control in each operating state responds quickly to changes in the target effective position 25. In this case, the relationship between the amplitude of the dither current control variable 64 and the actual dither amplitude 54 is strongly non-linear. In particular, the actual dither amplitude 54 suddenly becomes zero if the amplitude of the dither current control variable 64 falls below a certain limit value. This limit value is difficult to predefine, which is why the dither controller 63 preferably ensures that it is not fallen below at all.

For this purpose, the actual dither amplitude 54 is first determined as the actual variable of the corresponding control. In this case, the actual instantaneous position 21 undergoes band-pass filtering 50. The center frequency of the band-pass filter 50 is preferably equal to the frequency of the dither oscillator 60, i.e. for example 140 Hz. The actual dither amplitude 54 is the averaged peak-to-peak amplitude of this filtered signal. By means of the extreme value determination 51, first the extreme values or the peaks of the filtered signal are determined, i.e. the values at which the filtered signal assumes its largest or its smallest value. Subsequently, the difference 52 between a maximum and an immediately following minimum is formed. A mean value 53 is then formed from a plurality of these differences, such that the actual dither amplitude 54 changes comparatively slowly. For example, averaging over three of the mentioned differences is performed.

In addition, the target dither amplitude 66 flows into the target-actual comparison 65 of the dither control. It would now be conceivable to set this constantly to the desired minimum dither amplitude. However, this has the consequence that, after the system has been switched on, it takes a comparatively long time until the control slide performs the desired micromovements. Therefore, it is preferred for the target dither amplitude 66 to be selected, after the system is switched on, so as to be so large that the dither movement begins safely and very quickly. Thereafter, the target dither amplitude 66 is slowly reduced to the desired minimum dither amplitude, until this is reached. Although this results in a higher noise level immediately after switching on, the position control of the valve is optimal immediately after switching on.

One is added 62 to the output variable of the dither controller 63, in order to obtain the desired multiplication factor for the multiplier 61. In addition to this simple amplitude modulation, it is possible to adjust the waveform of the dither oscillator 60. In this case, the adjustment of the waveform results in a more sensitive actuating behavior than the adjustment of the amplitude. Preferably, therefore, first the waveform is adjusted, the amplitude being adjusted only if the effect of the waveform adjustment is not sufficient to correct the system. This situation is intended to be indicated by the dashed line 70 in FIG. 2.

Figure 3:
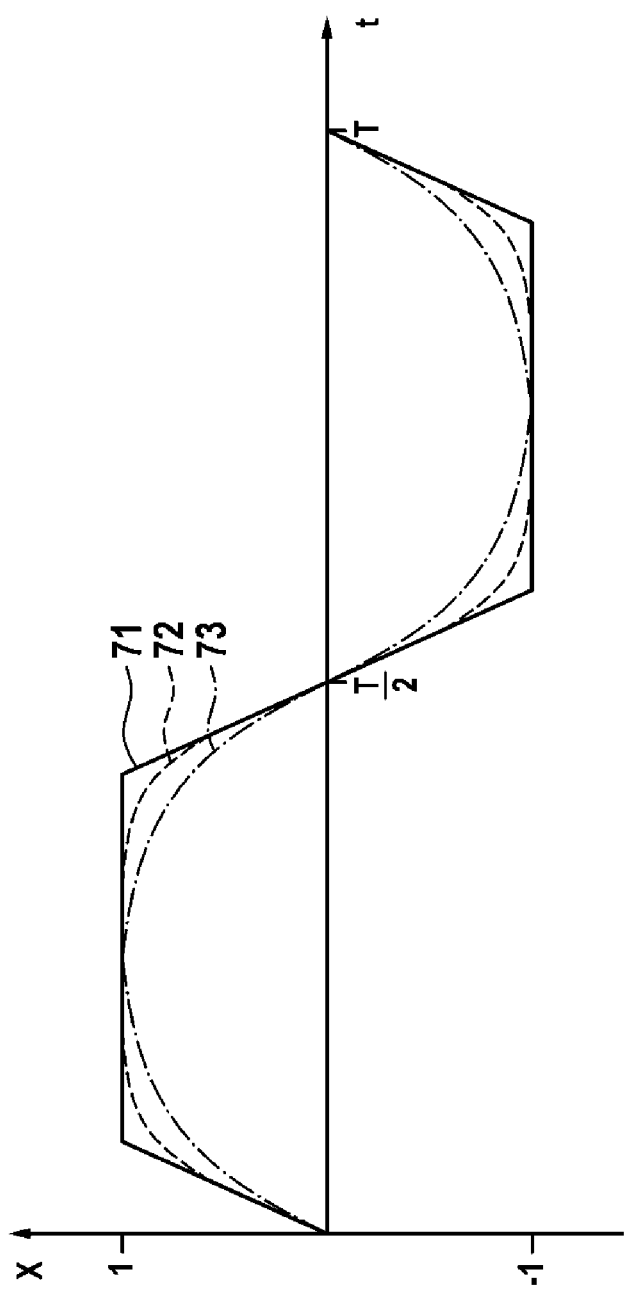
FIG. 3 is a graph of different waveforms of the dither current control variable.

FIG. 3 is a graph of different waveforms 71; 72; 73 of the dither current control variable 64. The time t is plotted on the horizontal, an entire oscillation period T and a half oscillation period T/2 being marked. The amplitude x of the waveform, which is standardized to +1 or −1, is plotted on the vertical. All the waveforms 71; 72; 73 are preferably point-symmetrical with respect to the zero crossing at T/2. The mathematical relationship $x(t)=-x(t+T/2)$ preferably furthermore applies.

The first waveform 71 is shown by a solid line. It comprises exclusively linear portions. It could be characterized as a square wave oscillation in which the signal change rate is limited upwards. Due to its sharp corners and the associated harmonics, the first waveform 71 causes the strongest oscillation excitation of the valve slide.

The second waveform 72 is shown as a dashed line where it deviates from the first waveform 71. It causes a weaker excitation than the first waveform 71, but a stronger excitation than the third waveform 73. The reason for this is that the corners of the first waveform 71 are somewhat rounded and/or beveled, such that the harmonic content is reduced relative to the first waveform 71.

The third waveform 73 is shown as a dot-dash line where it deviates from the first waveform 71. The mentioned corners are even more rounded or beveled than in the case of the second waveform 72, such that the third waveform 73 brings about the smallest excitation of the three waveforms 71; 72; 73 shown.

Of course, further waveforms can be provided according to the same pattern, which waveforms differ in their excitation effect at the same amplitude. For example, seven different waveforms are used to adjust the dither excitation as finely as possible.

The different waveforms 71; 72; 73 are preferably stored in the form of value tables in the control device (no. 16 in FIG. 1).

REFERENCE SIGNS

10 Valve
11 Control slide
12 Zero position
13 Spring
14 Solenoid
15 Pilot valve
16 Control device
20 Position sensor
21 Actual instantaneous position (c)
22 Actual effective position
23 First low-pass filter
24 Position controller
25 Target effective position
26 Target-actual comparison
27 Effective position control variable
30 Current control device
31 Switching device
32 Supply voltage
33 Ground
34 Pulse width modulator 35 Instantaneous current control variable
36 Superimposition
40 Current controller
41 Current sensor
42 Measuring resistor
43 Instantaneous current actual value (b1; b2)
44 Effective current actual value
45 Second low-pass filter
46 Target-actual comparison
47 Target effective current
50 Band-pass filter
51 Extreme value determination
52 Difference formation
53 Averaging
54 Actual dither amplitude
60 Dither oscillator
61 Multiplier
62 Amplification factor determination
63 Dither controller
64 Dither current control variable
65 Target-actual comparison
66 Target dither amplitude
71 First waveform
72 Second waveform
73 Third waveform

What is claimed is:

1. A method for operating a valve, comprising:
preloading a linearly movable control slide of the valve with at least one spring in a direction of a zero position;
coupling at least one solenoid to the control slide, such that the control slide is movable away from the zero position by application of a current to the at least one solenoid;
measuring an actual instantaneous position of the control slide using a position sensor;
assigning each solenoid of the at least one solenoid a current control device;
influencing, using the corresponding current control device, the current through the corresponding solenoid based on an instantaneous current control variable, the instantaneous current control variable dependent on a dither current control variable;
determining an actual dither amplitude from the actual instantaneous position using a band-pass filter; and
causing the actual dither amplitude to not fall below a predetermined minimum dither amplitude by adjusting an amplitude of the dither current control variable and/or of a waveform of the dither current control variable using a dither controller.

2. The method according to claim 1, wherein the determination of the actual dither amplitude comprises a determination of extreme values of the actual instantaneous position as filtered by the band-pass filter.

3. The method according to claim 2, wherein the determination of the actual dither amplitude comprises determining a difference formation of directly successive extreme values.

4. The method according to claim 3, wherein the determination of the actual dither amplitude comprises averaging a plurality of the determined difference formations.

5. The method according to claim 1, wherein:
the dither controller regulates the actual dither amplitude to a target dither amplitude, and
the target dither amplitude is greater than or equal to the predetermined minimum dither amplitude.

6. The method according to claim 5, wherein the target dither amplitude is reduced as long as the actual dither amplitude is above the predetermined minimum dither amplitude.

7. The method according to claim 5, wherein the dither controller is activated after the control slide is deflected from the zero position for a predetermined period of time.

8. The method according to claim 7, wherein the amplitude of the dither current control variable is selected to be so large during the predetermined period of time that the actual dither amplitude is reliably above the predetermined minimum dither amplitude.

9. The method according to claim 1, wherein the waveform of the dither current control variable is changed in steps.

10. The method according to claim 1, wherein:
the current control device comprises a switching device for switching a supply voltage on and off at the corresponding solenoid,
a pulse width modulator is actuated by the instantaneous current control variable, and
the pulse width modulator actuates the switching device.

11. The method according to claim 1, wherein:
each solenoid of the at least one solenoid is assigned a current sensor and a current controller,
an instantaneous current actual value flowing through the corresponding solenoid is measured using the corresponding current sensor, and
the current controller regulates an effective current actual value, calculated from the instantaneous current actual value, to a target effective current, by adjusting the instantaneous current control variable.

12. The method according to claim 11, wherein the target effective current is formed by superimposing an effective position control variable and the dither current control variable.

13. The method according to claim 12, further comprising:
regulating an actual effective position calculated from the actual instantaneous position to a target effective position by adjusting the effective position control variable using a position controller.

* * * * *